(12) United States Patent
Yamashita

(10) Patent No.: US 7,203,698 B2
(45) Date of Patent: Apr. 10, 2007

(54) INFORMATION RELEVANCE DISPLAY METHOD, PROGRAM, STORAGE MEDIUM AND APPARATUS

(75) Inventor: Tatsuhiro Yamashita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 470 days.

(21) Appl. No.: 10/772,298

(22) Filed: Feb. 6, 2004

(65) Prior Publication Data

US 2004/0193587 A1 Sep. 30, 2004

(30) Foreign Application Priority Data

Mar. 3, 2003 (JP) .............................. 2003-055312

(51) Int. Cl.
G06F 17/30 (2006.01)
(52) U.S. Cl. .................................... 707/102; 707/104.1
(58) Field of Classification Search .................... 707/3, 707/10, 200, 102, 104.1; 345/440; 709/224
See application file for complete search history.

(56) References Cited

U.S. PATENT DOCUMENTS

| 5,764,239 A | 6/1998 | Misue et al. ................. 345/440 |
| 2004/0133555 A1* | 7/2004 | Toong et al. ................... 707/2 |

FOREIGN PATENT DOCUMENTS

| JP | 8-30799 A | 2/1996 |
| JP | 2002-91991 | 3/2002 |
| WO | WO 01/16805 A2 | 3/2001 |
| WO | WO 02/11048 A2 | 2/2002 |

OTHER PUBLICATIONS

Ito Takashi, Patent Abstracts of Japan, "System and Method for Supporting Study on Gene Network", Publication No. 2002091991 and Publication Date: Mar. 29, 2002.
Butte A J et al, "Discovering Functional Relationships Between RNA Expression and Chemotherapeutic Susceptibility Using Relevance Networks," Proceedings of the National Academy of Sciences of USA, National Academy of Science, Washington, DC, US, vol. 97, No. 22, Oct. 24, 2000, pp. 12182-12186, XP002204532.
Butte A J et al., "Mutual Information Relevance Networks: Functional Genomic Clustering Using Pairwise Entropy Measurements," Proceedings of the Pacific Symposium on Biocomputing, Jan. 4, 2000, pp. 1-12, XP002286698.

(Continued)

Primary Examiner—Apu M. Mofiz
(74) Attorney, Agent, or Firm—Staas & Halsey LLP

(57) ABSTRACT

Relevance data is displayed in a manner that allows the relevance data to be comprehended visually and intuitively. Relevance data includes element information and attribute information and is displayed as a network of element nodes and attribute nodes. The element information and attribute information is searched, designated as either element information or attribute information, and relevance information is extracted to reflect when an attribute is shared by a more than one element. Furthermore, a first network is displayed in which two element nodes with common attributes are connected. Alternatively, a second network is displayed in which attribute nodes are connected to element nodes when an element node posses an attribute node.

10 Claims, 15 Drawing Sheets

OTHER PUBLICATIONS

Schneiderman B., Chapter 15: Information Search and Visualization, "Designing the User Interface: Strategies for Effective Human-Computer Interaction" 1992, Designing the User Interface Strategies for Effective Human Computer Interaction, Reading, Addison Wesley, US, 1997, pp. 519-521,526, XP002210867.

Hemmje, M. et al., Association for Computing Machinery, "Lyber World a Visualization User Interface Supporting Fulltext Retrieval," SIGIR '94. Dublin, Jul. 3-6, 1994, Proceedings of the Annual International ACM-SIGIR Conference on Research and Development in Information Retrieval, Berlin, Springer,DE, vol. CONF. 17, Jul. 3, 1994, pp. 249-259, XP000475325.

Kolpakov Fedor A. et al., "GeneNet: A Gene Network Database and Its Automated Visualization," Bioinformatics, Oxford University Press, Surrey, GB, vol. 14, No. 6, 1998, pp. 529-537, XP002956536.

European Search Report dated Feb. 27, 2006.

* cited by examiner

FIG. 4

| ELEMENT ID 50 | ELEMENT NAME 52 | POSSESSING ATTRIBUTE 54 | ELEMENT NODE DISPLAY FLAG 55 |
|---|---|---|---|
| N001 | Node1 | V002, V003, V005, V008 | 1 |
| N002 | Node2 | V003, V005, V009 | 1 |
| N003 | Node3 | V002, V005, V010 | 1 |

| ATTRIBUTE ID 56 | ATTRIBUTE NAME 58 | END FLAG 60 | PARENT ATTRIBUTE 62 | ATTRIBUTE INFORMATION SEARCH FLAG 63 | ATTRIBUTE NODE DISPLAY FLAG 64 |
|---|---|---|---|---|---|
| V000 | V | 0 | | 0 | 0 |
| V001 | V1 | 0 | V000 | 0 | 0 |
| V002 | V11 | 1 | V001 | 1 | 1 |
| V003 | V12 | 1 | V001 | 1 | 1 |
| V004 | V2 | 0 | V000 | 0 | 0 |
| V005 | V21 | 1 | V004 | 1 | 1 |
| V006 | V22 | 1 | V004 | 0 | 0 |
| V007 | V3 | 0 | V000 | 0 | 0 |
| V008 | V31 | 1 | V007 | 1 | 0 |
| V009 | V32 | 1 | V007 | 1 | 0 |
| V010 | V33 | 1 | V007 | 1 | 0 |

| RELEVANCE ID 65 | FROM (CONNECTION SOURCE NODE) 66 | TO (CONNECTION DESTINATION NODE) 68 | COMMON ATTRIBUTE ID 70 | EDGE DISPLAY FLAG 72 | EDGE COUPLING STRENGTH 74 |
|---|---|---|---|---|---|
| R001 | N001 | N002 | V003, V005 | 0 | 2 |
| R002 | N001 | N003 | V002, V005 | 0 | 2 |
| R003 | N002 | N003 | V005 | 0 | 1 |
| R004 | V003 | N001 | | 1 | 1 |
| R005 | V003 | N002 | | 1 | 1 |
| R006 | V005 | N001 | | 1 | 1 |
| R007 | V005 | N002 | | 1 | 1 |
| R008 | V005 | N003 | | 1 | 1 |
| R009 | V002 | V003 | | 1 | 1 |
| R010 | V002 | V005 | | 1 | 0.5 |
| R011 | V003 | V005 | | 1 | 0.5 |

FIG. 15

| DISPLAY STATUS | DESCRIPTION |
|---|---|
| 150 — ☐ | NOT BECOMING SEARCH TARGET |
| 152 — ☑ | SEARCH TARGET DESIGNATION |
| 154 — ⊟ | SEARCH TARGET AND ATTRIBUTE NODE DISPLAY DESIGNATION |

INFORMATION RELEVANCE DISPLAY METHOD, PROGRAM, STORAGE MEDIUM AND APPARATUS

BACKGROUND OF THE INVENTION

1. Field of the Invention

The invention relates generally to an information relevance display method, program, storage medium and apparatus which perform network display of commonality between pieces of element information by utilizing relevance according to attributes possessed by element information such as gene information, and more specifically, to an information relevance display method, program, storage medium and apparatus which display the relevance with the network in which elements are connected as nodes by edges of common attributes.

2. Description of the Related Art

Traditionally, in the field of bioinformatics, starting with sequence analysis of human genome, the genome sequence analysis of animals other than human, plants, micro-organisms and the like is currently underway, and these genome sequence data is registered in databases which are administered by public institutions of countries, published through the internet to all over the world and utilized extensively. Usually, in bioresearch, properties for each gene, such as what functions it has, where in the body it works and what proteins it generates, are examined and stored in public sites and local sites all over the world. In this case, the genes which have the same properties are considered to play the same role, and researchers strive to predict what role the newly discovered genes play and to identify genes associated to disease, as they repeat experiments based on these information analysis and analysis.

However, in these traditional genome researches, for genes disclosed as the genome sequence data, researchers examined in what way the relevance (commonality) of each data exists by looking into individual data, and problem exists in that it is difficult for analysts to focus attention on the relevance, especially the commonality, of certain gene, as they cover huge volumes of data, and to look into and intuitively capture characteristics thereof. These problems also exit in the data analysis in various fields in which it is needed to intuitively capture the commonality of individual data and other data, covering huge volumes of data other than bioinformatics.

SUMMARY OF THE INVENTION

According to the invention there is provided an information relevance display method, program, storage medium and apparatus which perform the display enabling the relevance of data to be comprehended visually and intuitively.

In order to achieve the above object, according to a first aspect of the present invention there is provided an information relevance display method comprising:

a search designation step which, by a search designation unit, designates element information and attribute information;

a relevance information extract step which, by a relevance information extract unit, extracts attributes common to two pieces of element information as relevance information from possessed attributes of plural pieces of element information designated in the search designation step;

a first network display step which, by a first network display unit, displays a first network by arranging and displaying, for the element information and the attribute information designated in the search designation step, the element information as element nodes, and by connecting with edges two element nodes possessing common attribute information by referring to the relevance information; and a second network display step which, by a second network display unit, displays a second network by converting possessed attributes of the element nodes in the first network into a display of attribute nodes for arrangement and by connecting with edges the element nodes and the attribute nodes of the possessed attributes thereof.

According to the relevance information display of the invention, a first network is displayed, in which two (2) nodes with common attributes are connected by a line defined as an edge in the situation that a plurality of element nodes are arranged, for example, in a circle, and nodes at which the edges are concentrated can be comprehended as the nodes with high commonality at a glance and can be comprehended as notable elements Adversely, for nodes with extremely less edges, low commonality can be comprehended.

Also, though attributes constitute the edges which connect the element nodes in the display of the first network, it is possible to change into the display of a second network in which these attributes which the edges have are converted into attribute nodes and connected to the element nodes which possess attributes for the attribute nodes by the edges, and it is possible to intuitively comprehend commonality to the element nodes when the attributes are looked from the viewpoint of nodes.

At this point, the first network display step is characterized in that a plurality of the element nodes is arranged uniformly. With this uniform arrangement of the element nodes, it is possible to intuitively comprehend the distribution in connection status of edges which connect between the element nodes according to common attributes, as the density of the edges.

In the first network display step, it may be possible to arrange the element nodes depending on the degree of strength of the commonality, such as the number of the common attributes. For example, when the number of the common attributes is higher, a distance from other element nodes is shortened, and the strength of the commonality is emphasized.

In the second network display step, the attribute nodes are arranged based on distances corresponding to position information for an attribute hierarchical structure. For example, the attribute nodes are arranged in proportion to the distance in the hierarchical structure, making it possible to intuitively comprehend that the distance is shorter, the relevance is higher.

In the second network display step, the attribute nodes are arranged by finding distances corresponding to position information for the attribute hierarchical structure to which predefined weight is added. With this weight, it is possible to display such that certain commonality is emphasized manually or automatically.

In the second network display step, the second network is displayed by converting and arranging the common attributes represented by all or some of the designated edges in the first network into display of the attribute nodes and by connecting the element nodes and the attribute nodes for the possessed attributes thereof with the edges. In this way, the second network display is performed, in which only some of the edges are converted into the attribute nodes in the first network display, and it is possible to perform the mixed display of the first network and the second network.

In the search designation step, a select list for element information and a select list for attribute information represented by a hierarchical structure are displayed in the screen displaying the first network or the second network, and selective designation of the element information and/or the attribute information is prompted. Therefore, users can display the network of relevance and perform analysis work for notable characteristics, as they accordingly designate the element information and the attribute information designations.

To achieve the above object, according to a second aspect of the present invention there is provided a program for information relevance display executed by a computer. The program allows the computer to execute:

a search designation step which designates element information to be searched in an element information file that stores element information including element names to be searched and possessed attributes, as well as attribute information in an attribute information file which stores attribute information including attribute names;

a relevance information extract step which extracts attributes common to two pieces of element information as relevance information from possessed attributes of plural pieces of element information designated in the search designation step;

a first network display step which displays a first network by arranging and displaying, for the element information and the attribute information designated in the search designation step, the element information as element nodes and by connecting with edges two element nodes possessing common attribute information by referring to the relevance information; and a second network display step which displays a second network by converting possessed attributes of the element nodes in the first network into a display of attribute nodes for arrangement and by connecting with edges the element nodes and the attribute nodes of the possessed attributes thereof.

To achieve the above object, according to a third aspect of the present invention there is provided a computer-readable storage medium which stores a program for the information relevance display executed by a computer. The record medium stores a program therein which allows the computer to execute:

a search designation step which designates element information in an element information file that stores element information including element names to be searched and possessed attributes, as well as attribute information in an attribute information file which stores attribute information including attribute names;

a relevance information extract step which extracts attributes common to two pieces of element information as relevance information from possessed attributes of plural pieces of element information designated in the search designation step;

a first network display step which displays a first network by arranging and displaying, for the element information and the attribute information designated in the search designation step, the element information as element nodes and by connecting with edges two element nodes possessing common attribute information by referring to the relevance information; and a second network display step which displays a second network by converting possessed attributes of the element nodes in the first network into a display of attribute nodes for arrangement and by connecting with edges the element nodes and the attribute nodes of the possessed attributes thereof.

To achieve the above object, according to a fourth aspect of the present invention there is provided a search information relevance display apparatus comprising:

an element information file which stores element information including element names to be searched and possessed attributes;

an attribute information file which stores attribute information including attribute names;

a search designation unit which designates element information in the element information file and attribute information in the attribute information file;

a relevance information extract unit which extracts attributes common to two pieces of element information as relevance information, from possessed attributes of plural pieces of element information designated by the search designation unit;

a first network display unit which displays a first network by arranging and displaying, for the element information and the attribute information designated by the search designation unit, the element information as element nodes, and by connecting with edges two element nodes possessing common attribute information by referring to the relevance information; and a second network display unit which displays a second network by converting possessed attributes of the element nodes in the first network into a display of attribute nodes for arrangement and by connecting with edges the element nodes and the attribute nodes of the possessed attributes thereof.

The details of the program, storage medium and information relevance display unit of the present invention will become essentially the same as those of the information relevance display method.

The above and other objects, aspects, features and advantages of the present invention will become more apparent from the following detailed description when taken in conjunction with the accompanying drawings.

BRIEF DESCRIPTION OF THE DRAWINGS

FIG. 4 is a schematic diagram of element information stored in the element information file of FIG. 1;

FIG. 5 is a schematic diagram of attribute information stored in the attribute information file of FIG. 1;

FIG. 6 is a schematic diagram of relevance information stored in the relevance information file of FIG. 1;

FIG. 15 is a schematic diagram of display status of check boxes displayed in the attribute information display list of FIG. 13.

DESCRIPTION OF THE PREFERRED EMBODIMENTS

Figure 1:
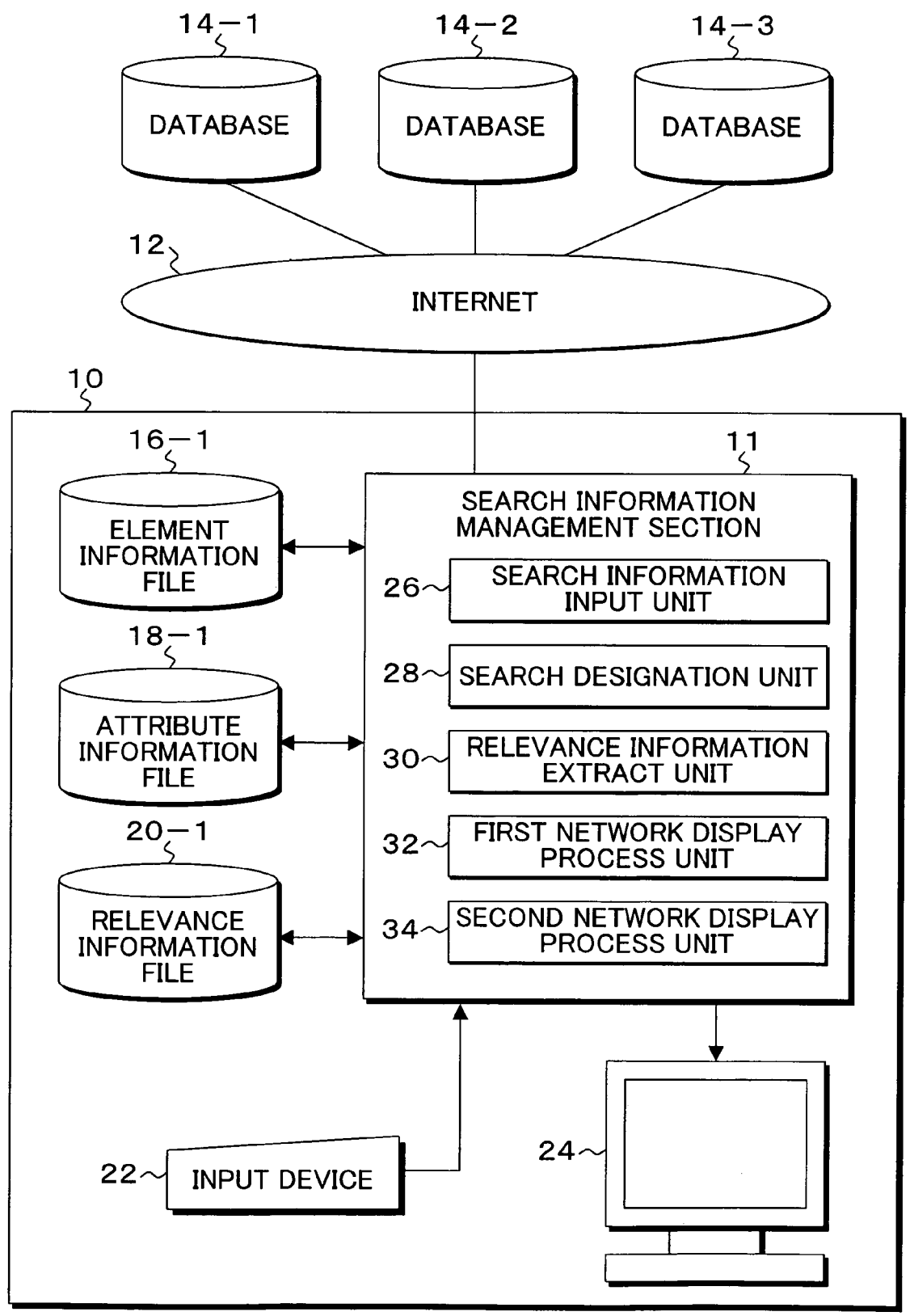
FIG. 1 is a block diagram showing an embodiment of an information relevance display apparatus with a function structure thereof according to the invention.

FIG. 1 is a block diagram showing an embodiment of an information relevance display apparatus with a function structure thereof according to the invention. In FIG. 1, the information relevance display apparatus 10 of the invention is achieved by a personal computer and, for example via the internet 12, able to connect to databases 14-1, 14-2 and 14-3 of public sites, collects search target data from the databases 14-1 to 14-3 and executes a display process for information relevance. As these search target data collected from the databases 14-1 to 14-3, for example gene information published in bioinformatics field may be quoted. The information relevance display apparatus 10 is provided with a search information management section 11, and to the search information management section 11, an element information file 16-1, an attribute information file 18-1, a relevance information file 20-1, an input device 22 such as a keyboard and a tablet and a display 24 are connected. In order to achieve the information relevance display process according to the invention, the search information management section 11 is provided with a search information input unit 26, a search designation unit 28, a relevance information extract unit 30, a first network display process unit 32 and a second network display process unit 34, as functions to be achieved by execution of programs. With the access to the databases 14-1 to 14-3 via the internet 12, the search information input unit 26 inputs the element information including element names and possessed attributes and stores into the element information file 16-1, and simultaneously inputs the attribute information including attribute names and position information for an attribute hierarchical structure and stores into the attribute information file 18-1. The search designation unit 28 designates plural pieces of the element information and the attribute information based on operations of the input device 22. The relevance information extract unit 30 extracts common attributes for two (2) element information as relevance information from the possessed attributes of the plural pieces of the element information designated in the search designation unit 28, and stores into the relevance information file 20-1. The first network display process unit 32 arranges and displays the element information designated in the search designation unit 28 as the element nodes on the display screen of the display 24, as well as displays the first network in which two (2) element nodes having common attribute information are connected by the edge with reference to the relevance information in the relevance information file 20-1. The edge herein is a line with an orientation which defines one element node as a connection source and other element node as a connection destination, and in following description, though this is defined as the edge, it represents a linear route which connects nodes in a network.

The second network display process unit 34 converts and arranges the possessed attributes of the element nodes into the display of the attribute nodes in the first network displayed on the display 24 by the first network display process unit 32, and displays second network by connecting between the element nodes and the attribute nodes for the possessed attributes thereof with the edges. In other words, the second network display process unit 34 converts the edges into the attribute nodes by filtering the edges of the first network displayed by the first network display process unit 32, and performs the network display in which notable attributes are emphasized hereby. The personal computer which achieves the information relevance display apparatus 10 of the invention in FIG. 1 is, for example, achieved by hardware resources of a computer as shown in FIG. 2.

Figure 2:
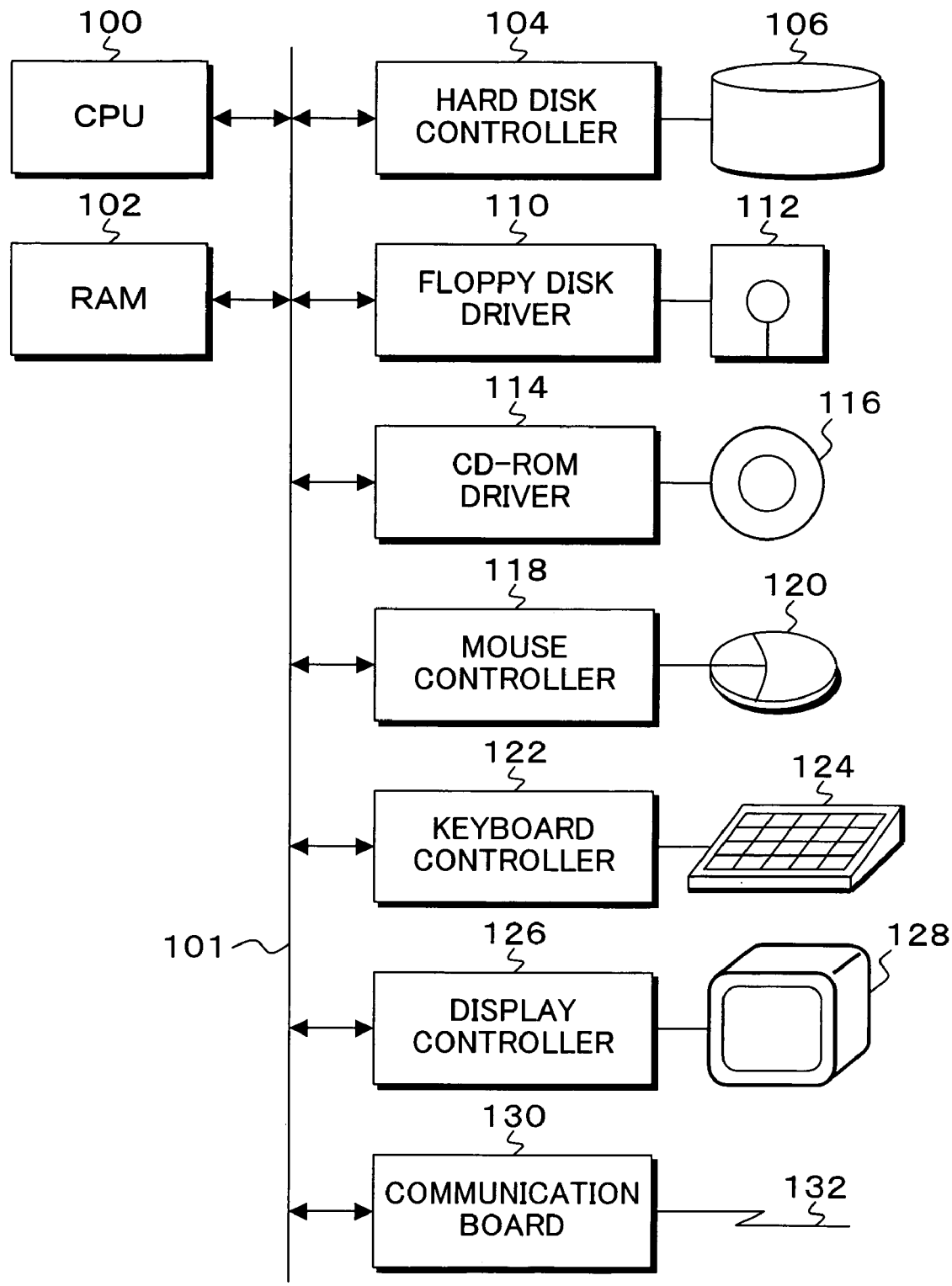
FIG. 2 is a schematic diagram of hardware environment of a computer to which the information relevance display apparatus of FIG. 1 is applied.

In the computer of FIG. 2, a bus of CPU 100 is connected with RAM 102, a hard disk controller (software) 104, a floppy disk driver (software) 110, a CD-ROM driver (software) 114, a mouse controller 118, a keyboard controller 122, a display controller 126 and a communication board 130. The hard disk controller 104 is connected with a hard disk drive 106 and loaded with an application program which executes the information relevance display process of the invention, and by calling a necessary program from the hard disk drive 106 at startup of the computer, deploying the program on RAM 102 and executing it in CPU 100, the information relevance display by the display controller 126 is performed. The floppy disk driver 110 is connected with a floppy disk drive (hardware) 112 and can read from and write to a floppy disk (R). The CD-ROM driver 114 is connected with a CD drive (hardware) 116 and can read data and programs stored in CD. The mouse controller 118 transfers input operations with the mouse 120 to CPU 100. The keyboard controller 122 transfers input operations with the keyboard 124 to CPU 100. The display controller 126 performs the display on the display unit 128. The communication board 130 uses a communication line 132, collects information from the databases via networks such as the internet and communicates with other computers or servers.

Figure 3:
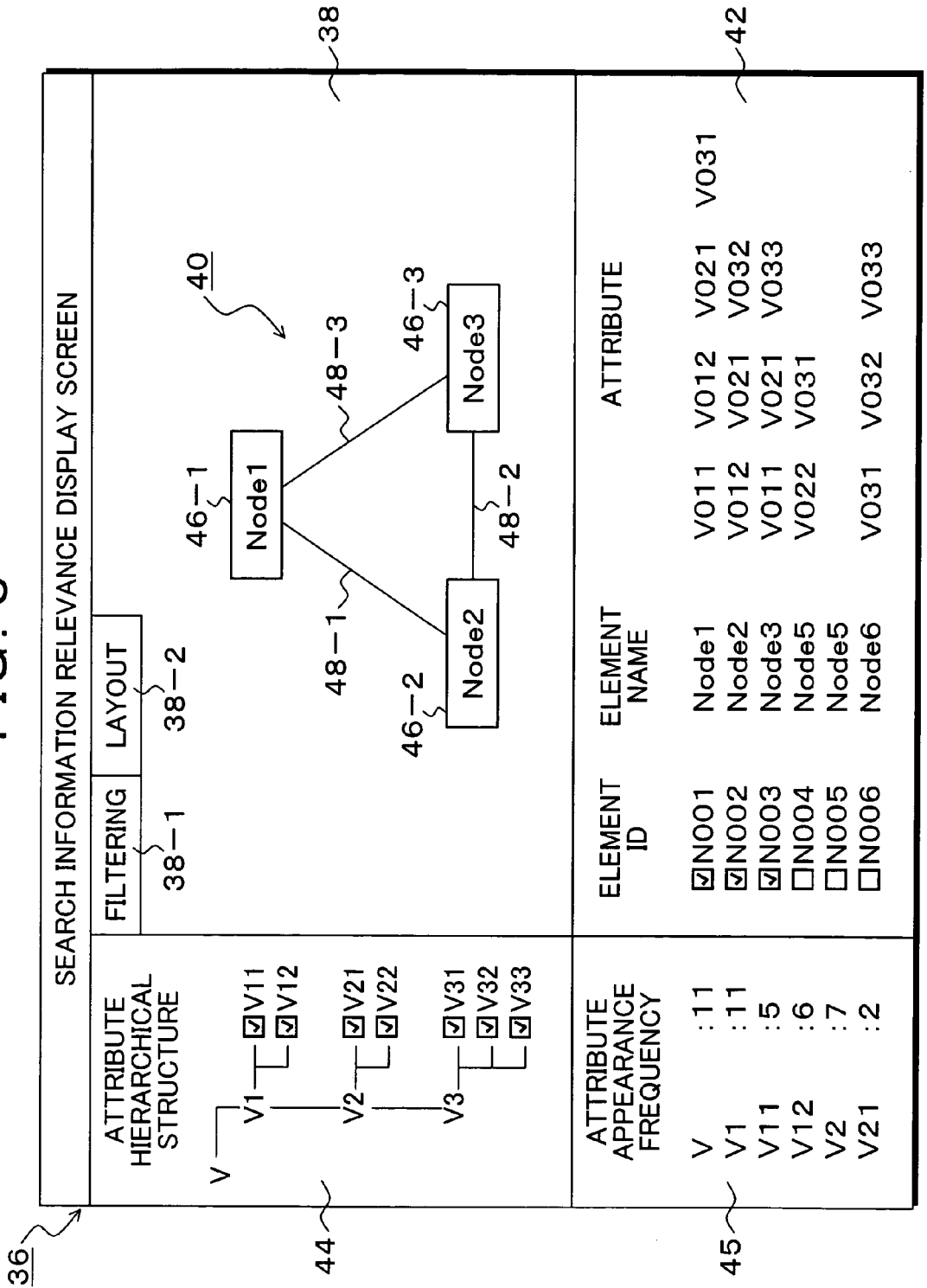
FIG. 3 is a schematic diagram of a display screen displaying a first network according to the invention.

FIG. 3 is a block diagram of a display screen 36 of the information relevance which is displayed on the display 24 by the first network display process unit 32 of FIG. 1. In this display screen 36, centering on a network display area 38, a element information list 42 is displayed on the underside, as well as an attribute information list 44 represented by a hierarchical directory structure is displayed on the left side, and an attribute appearance frequency list 45 is displayed under it. Also, a filtering button 38-1 and a layout button 38-2 is provided at upper left corner of the network display area 38; by manipulating the filtering button 38-1, the first network 40 as shown or the second network is displayed in the network display area 38 based on designations of search targets; and by manipulating the layout button 38-2, the element nodes and the attribute nodes are arranged depending on degrees of commonalities of the edges and weighting.

This displayed information on the display screen 36 of the search information relevance display in FIG. 3 is based on element information 16 in FIG. 4, attribute information 18 in FIG. 5 and relevance information 20 in FIG. 6. The element information 16 in FIG. 4 consists of element ID 50, element names 52, possessed attributes 54 and element node display flags 55. The element information 16 is generated on the element information file 16-1 based on obtaining of search target data from the databases 14-1 to 14-3 by the search information input unit 26 provided to the search information management section 11 of FIG. 1. The element node display flags 55 in the element information 16 are set to a display flag=1 for the elements designated as the search targets by processes in the search designation unit 28, based on the designation of the elements which are designated as the search targets by a user with the input device 22. The attribute information 18 in FIG. 5 is consists of attribute ID 56, attribute names 58, end flags 60, parent attributes 62, attribute information search flags 63 and attribute node display flags 64. At this point, when the attribute information 18 is represented using the attribute names 58, it has the hierarchical structure as shown in the attribute information list 44 in FIG. 3. This hierarchical structure is defined by the end flags 60 and the parent attributes 62. The attribute information search flags 63 are set to a search flag=1 for the attributes designated as the search targets by processes in the search designation unit 28, based on the designation of the attributes which are designated as the search targets by a user with the input device 22. The attribute node display flags 64 are set to 1 in order to indicate attributes which are displayed as the attribute nodes in the second network.

The relevance information 20 in FIG. 6 is consists of relevance ID 65, connection source nodes 66 indicated by "From", connection destination nodes 68 indicated by "To", common attribute ID 70, edge display flags 72 and edge coupling strength 74. This relevance information 20 holds common attributes of two (2) elements which is obtained by referring to the possessed attributes 54 of each elements in the element information 16 of FIG. 4, as the common attribute ID 70. For example, for R001 of the relevance ID 65 in the relevance information 20, when looking at the relevance of the element ID=N001 of the connection source nodes 66 and the element ID=N002 of the connection destination nodes 68 in the element information 16 of FIG. 4, two (2) attribute IDs, V003 and V005, out of the possessed attributes 54 of each ID are common, and these are stored in the common attribute ID 70 in the relevance information 20 of FIG. 6. The edge display flags 72 are set to 1 if the edge display is performed in the network display, and set to 0 if it's not performed. The set status of the edge display flags 72 in the relevance information 20 of FIG. 6 is the set status of the display flags for the display of the second network. As opposed to this, in the first network display status, the attribute node display is not performed and only the display of the element nodes is performed, therefore the inverse relevance occurs, wherein 0 in the edge display flag 72 will be 1 and 1 will be 0. The edge coupling strength 74 can be configured manually or automatically by calculations. In the automatic configuration by calculations, for example values corresponding to the number of the common attributes or the strength of the commonality are configured. This value of the edge coupling strength is utilized as the weight to correct the relevance in uniform arrangement of the element nodes in the first network.

The first network 40 displayed in the network display area 38 on the display screen 36 of FIG. 3 is displayed based on the element information 16, the attribute information 18 and the relevance information 20 of FIG. 4, FIG. 5 and FIG. 6, respectively. In the first network 40, for the elements for which the element node display flag 55 is set to 1 in the element information 16 of FIG. 4, the elements nodes 46-1, 46-2 and 46-3 are uniformly arranged, for example, in a circle shape.

This arrangement of the element nodes 46-1 to 46-3 may be corrected by using the values of the edge coupling strength 74 in the relevance information 20 as the weights. For example, by checking the number of the common attribute IDs 70 in the relevance information 20, arrangement corresponding to this number of the common attribute IDs may be used. For the element nodes 46-1 to 46-3 arranged in the first network 40, "Node 1", "Node 2" and "Node 3" are displayed respectively, according to the element names 52 in the element information 16. The element nodes 46-1 to 46-3 in the arrangement display are connected with the edges 48-1, 48-2 and 48-3 based on the common attribute IDs 70 in the relevance information 20 in FIG. 6. The edge 48-1 represents the common attributes V003 and V005 which are possessed by the element nodes 46-1 and 46-2 herein. Also, the edge 48-2 represents the common attribute V005 which are possessed by the element nodes 46-2 and 46-3. Further, the edge 48-3 represents the common attributes V002 and V005 which are possessed by the element nodes 46-1 and 46-3. At this point, in the element information list 42 and the attribute information list 44 on the display screen 36 of FIG. 3, check boxes are provided to the element IDs and the attribute names respectively, and the element information and the attribute information to be the search targets are designated using these check boxes. The check box in the attribute information list 44 may indicates three (3) different statuses 150, 152 and 154 as shown in FIG. 15. The display status 150 represents that the relevant attribute is not considered as the search target. The attributes which are not considered as the search target are displayed in neither the first network display nor the second network display. In this way, it is possible to limit the information displayed. The display status 154 represents that the relevant attribute is considered as the search target and also that it is displayed as the attribute node in the second network display.

Figure 7:
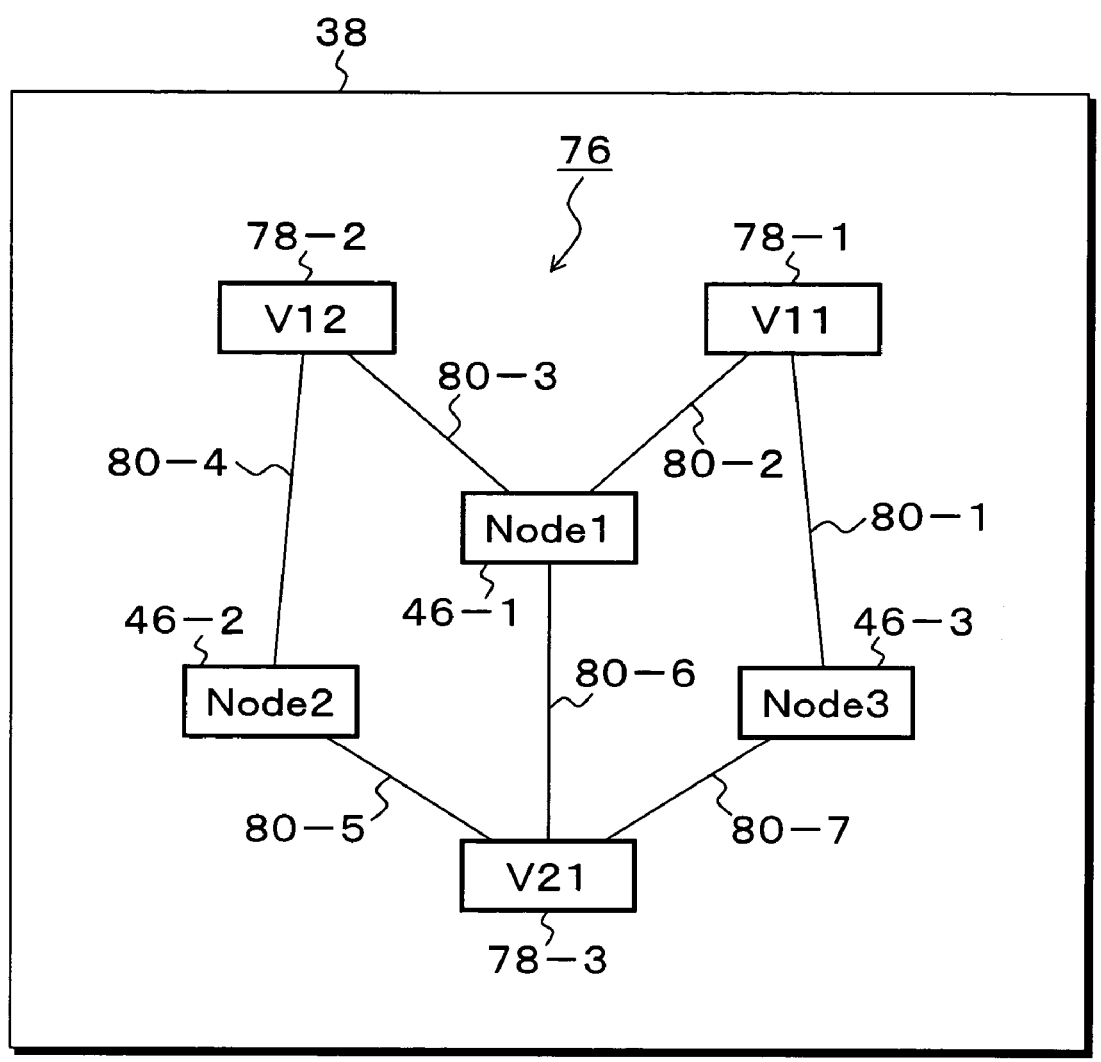
FIG. 7 is a schematic diagram of display of a second network according to the invention, in which all the edges of FIG. 3 are converted to attribute nodes.

In the display status of the first network 40 in FIG. 3, when the check boxes of the attribute information list 44 for the attribute names V11, V12 and V21 are configured to be the display status 154 which represents the attribute node display, and the filtering button 38-1 is manipulated, the network display area 38 will be converted to the display status of the second network 76 as shown in FIG. 7. For this second network 76, since the attribute names V11, V12 and V21 which express the edges 48-1, 48-2 and 48-3 in the first network 40 in FIG. 3 are designated as the attribute node display targets, as shown by the display status 154 in FIG. 15, by the check boxes of the attribute information list 44 in FIG. 3, when the filtering for conversion to the second network is performed by the manipulation of the filtering button 38-1, all the edges 48-1 to 48-3 in the first network will be represented by the attribute nodes 78-1, 78-2 and 78-3 and arranged as shown in the second network 76 of FIG. 7. Arrangement positions of the attribute nodes 78-1 to 78-3 in the second network 76 are determined according to positions in the attribute hierarchical structure in the attribute information list 44 of FIG. 3 by manipulating the layout button 38-2 in FIG. 3.

Figure 8:
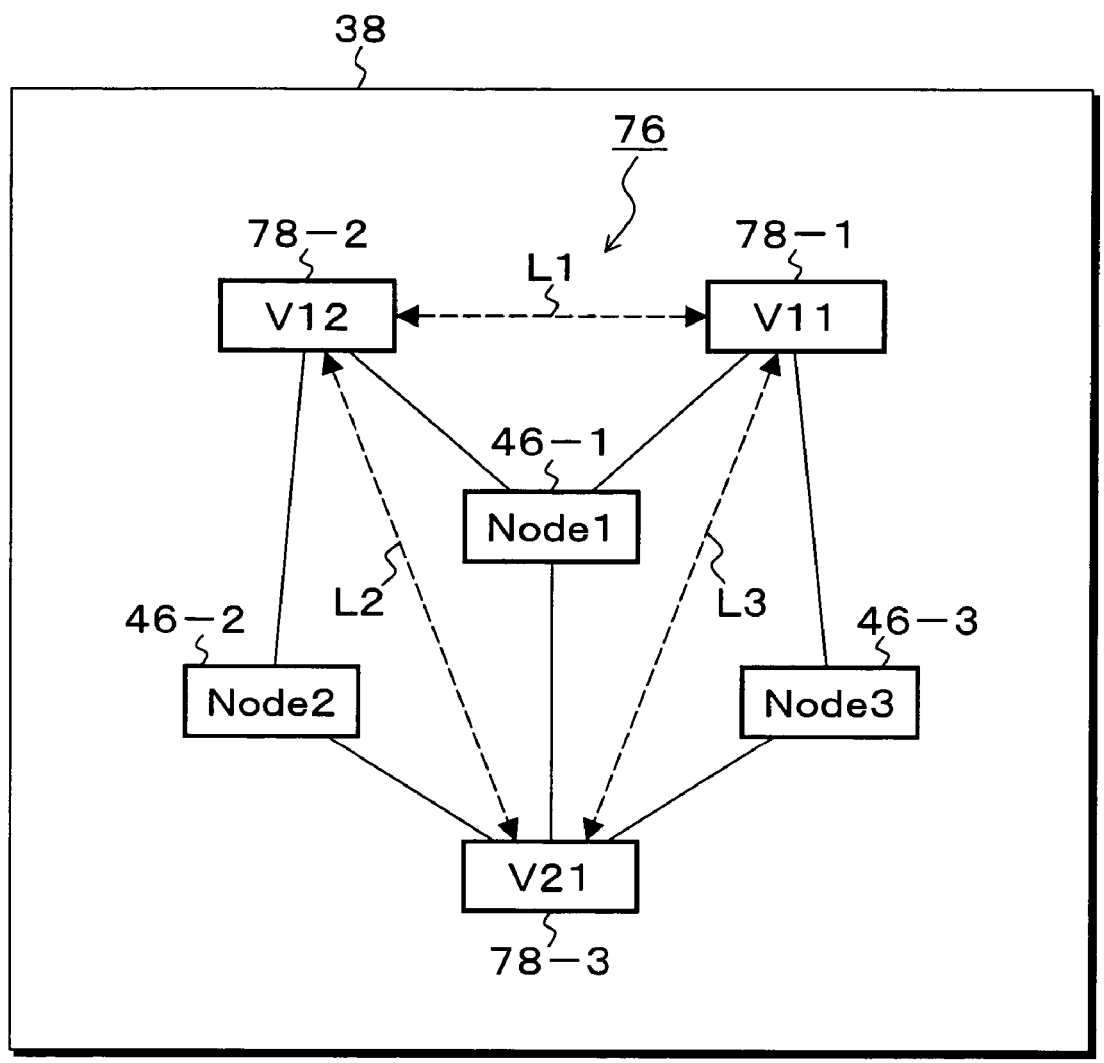
FIG. 8 is a schematic diagram of arrangement distance of the attribute nodes in FIG. 7.

FIG. 8 illustrates distances L1, L2 and L3 which indicate mutual positional relationship between the attribute nodes 78-1 to 78-3 in the second network 76. These distances L1, L2 and L3 which define the positional relations are based on the positional relevance in the hierarchical structure in the attribute information list 44 of FIG. 3, and the attribute nodes 78-1 and 78-2 for the attribute names V11 and V12 are adjoining and this results in short distance L1. As opposed to this, since the attribute node 78-3 for the attribute name V21 is more distant from the attribute nodes 78-1 and 78-2 for the attribute names V11 and V12 in the hierarchical positions, it is arranged with distances L2 and L3 which is longer than the distance L1. Therefore, by looking at mutual positional relationship between the attribute nodes 78-1, 78-2 and 78-3, it is understood at a glance that if the attribute node's relationship is closer, the commonality is stronger, and if it is more distant, the commonality is lower. Referring to FIG. 7 again, the attribute nodes 78-1 to 78-3 which are arranged and represented in the second network 76 perform the edge representation for relations which are set to 1 in the edge display flags 72 in the relevance information 20 of FIG. 6, between the element nodes 46-1 to 46-3 already displayed in the network 40. Specifically, the edges 80-1 to 80-7 are displayed as shown, from the attribute nodes 78-1 to 78-3 to the element nodes 46-1 to 46-3 which possess respective attributes. From this display of edges 80-1 to 80-7, it is known that the attribute name V11 of the attribute node 78-1 is possessed by the element node 46-1 and the element node 46-3. Also, it is known that the attribute name V12 of the attribute node 78-2 is possessed by the element node 46-1 and the element node 46-2. Further, it is known that the attribute name V21 of the attribute node 78-3 is possessed by the element node 46-1, 46-2 and 46-3.

Figure 9:
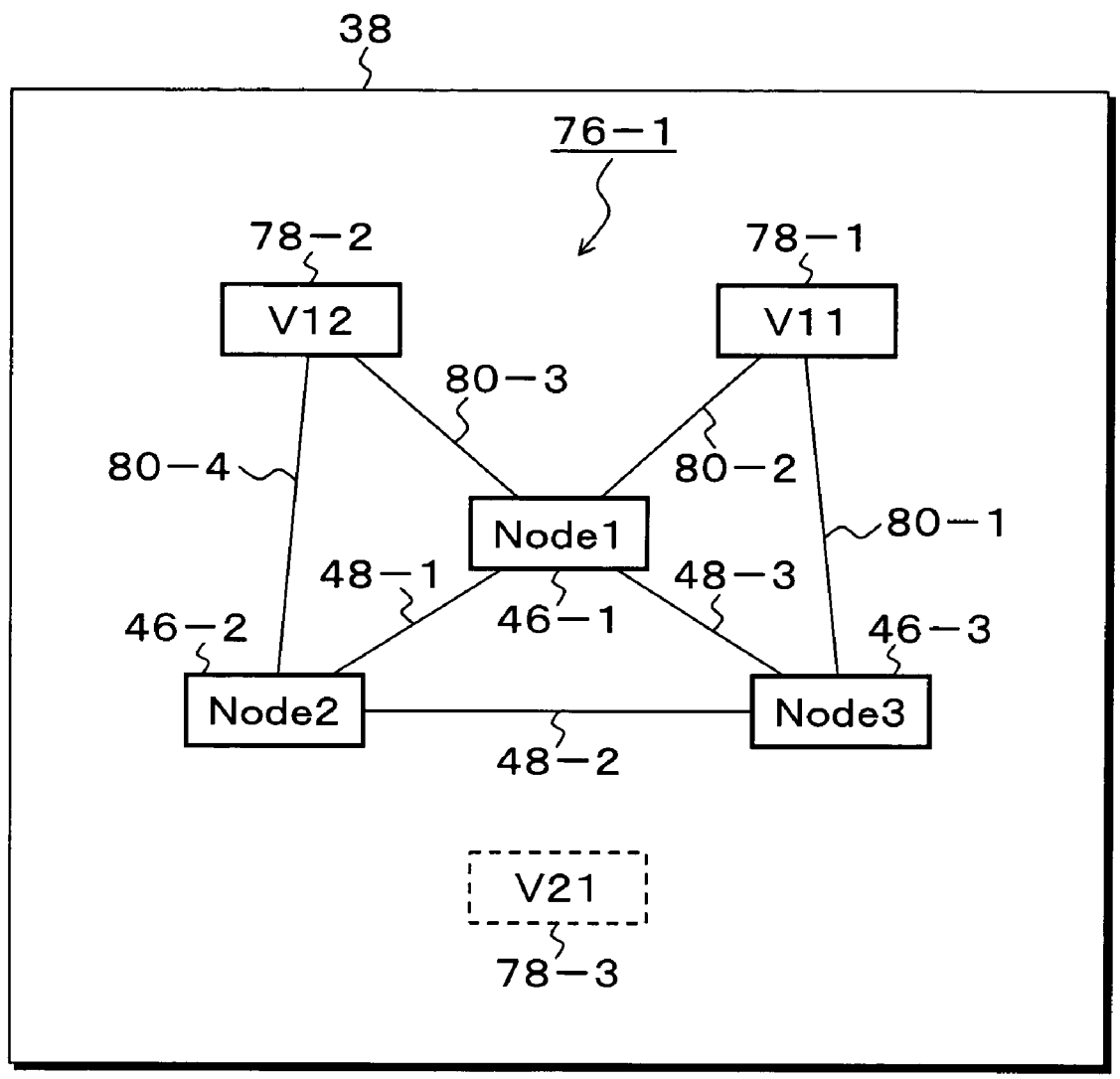
FIG. 9 is a schematic diagram of display of the second network according to the invention, in which some edges of FIG. 3 are converted to attribute nodes.

FIG. 9 is the display of the second network 76-1 which is displayed, in the case that the edges of the first network 40 in FIG. 3 are displayed by the attribute nodes, when the V21 is removed from the attribute node display targets and the filtering button 38-1 is manipulated. In this way, if the second network 76-1 is displayed with the attribute name V21 removed from the attribute node display targets, remaining attribute names V11 and V12 are displayed as the attribute nodes 78-1 and 78-2. It is noted that the attribute node 78-3 of the attribute name V21 is represented by dotted lines for the purpose of easy-to-understand illustration, but actually, the attribute node 78-3 is not displayed. For the attributes in the attribute node 78-3 which is not displayed, the structure of the first network 40 is remain intact as the edges 48-1, 48-2 and 48-3 which represent that the attribute ID=V005 is possessed by the element nodes 46-1, 46-2 and 46-3. This way, in the invention, it is possible to display the second network, if necessary, in which all or some of the edges representing the common attributes between the element nodes in the first network 40 of FIG. 3 are designated as the attribute node display targets. Naturally, in the display status of the second network 76 and 76-1 in FIG. 7 and FIG. 9, if the attribute names V11 and V12 are further removed from the attribute node display targets and the filtering button 38-1 in FIG. 3 are manipulated, then it is possible to go back to the former display of the first network 40.

Figure 10:
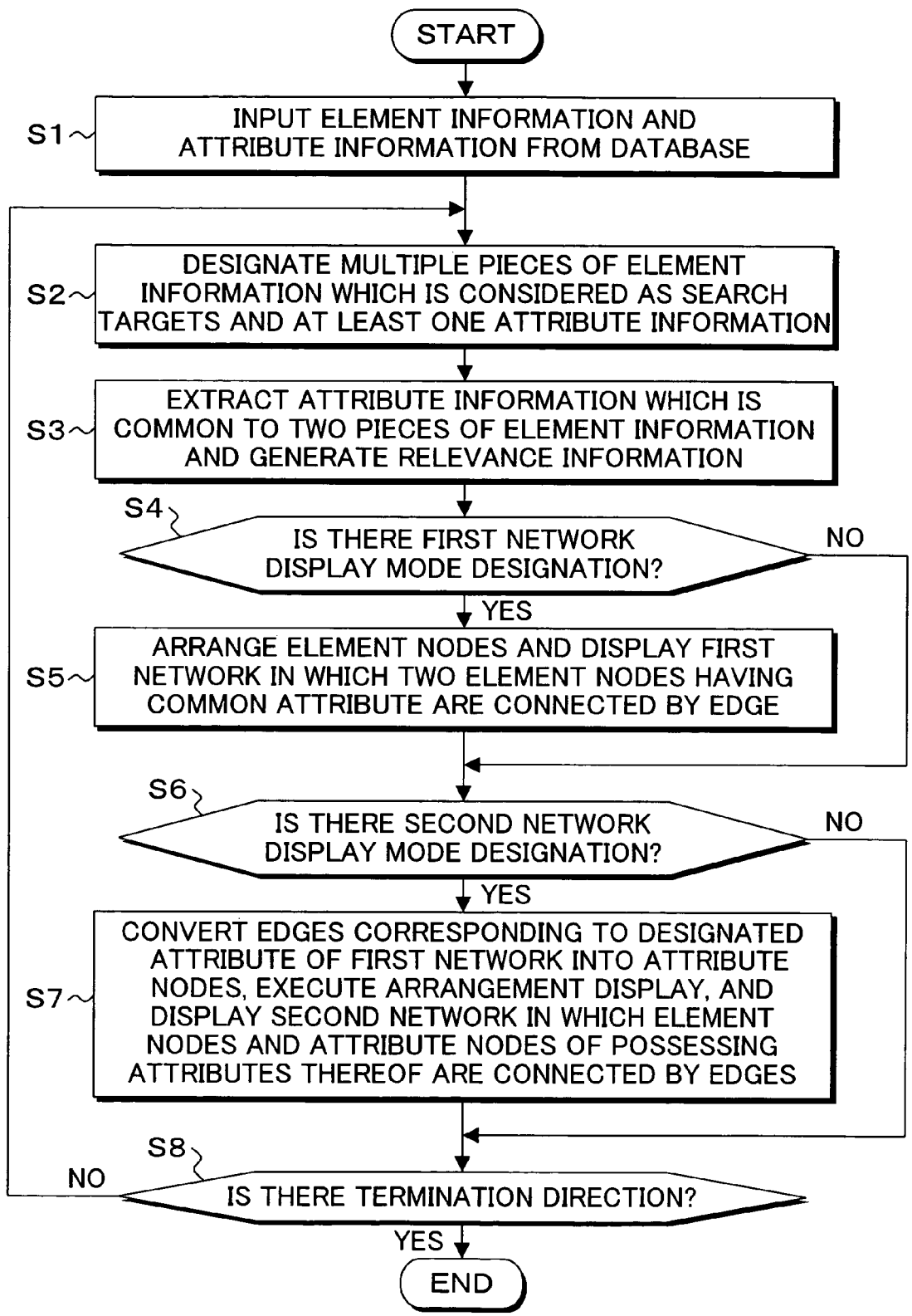
FIG. 10 is a flowchart of an information relevance display process according to the invention.

FIG. 10 is a flowchart of the information relevance display process according to the invention. In FIG. 10, first in step S1, the element information and the attribute information is input from the databases 14-1 to 14-3, and the element information 16 such as FIG. 4 and the attribute information 18 such as FIG. 5 is generated and stored in the element information file 16-1 and the attribute information file 18-1. Next, in-step S2, the element information and the attribute information to be considered as the search targets are designated based on the operation of the input device by the user. Specifically, since the input for designation is performed by the manipulation of the check boxes in the element information list 42 on the display screen 36 of FIG. 3 and the manipulation of the check boxes in the hierarchical structure in the attribute information list 44, setup is performed based on this for the element node display flags 55 in the element information of FIG. 4 as well as for the attribute information search flags 63 and attribute node display flags 64 in the attribute information of FIG. 5. Next, in step S3, considering plural pieces of designated element information as targets, common attribute information for two (2) pieces of the element information is extracted, and the relevance information 20 such as FIG. 6 is generated and stored in the relevance information file 20-1. Subsequently, in step S4, it is checked whether the designation for the first network display mode is present or not, and if present, the first network 40 is displayed in step S5, in which the element nodes are arranged and the edges are connected between two (2) element nodes possessing common attributes, as shown by the first network 40 in FIG. 3. Also, in step S6, if the designation for the second network display mode is identified, then, for example as shown in FIG. 7, the second network 76 is displayed, in which the edges corresponding to the designated attributes in the first network are converted into the attribute nodes, arranged and displayed, and then the edges are connected between the element nodes and the attribute nodes for the possessed attributes thereof. These processes of steps S2 to S7 are repeated until termination direction is given in step S8.

More specifically, the users perform display of the first network 40 as they change the designations for plural pieces of the element information and the attribute information to be considered as the search targets accordingly, convert the display into the second network display in which the edges in the first network 40 are converted into the attribute nodes and emphasized if necessary, and analyze characteristics of the search targets as they look at the network display.

Figure 11:
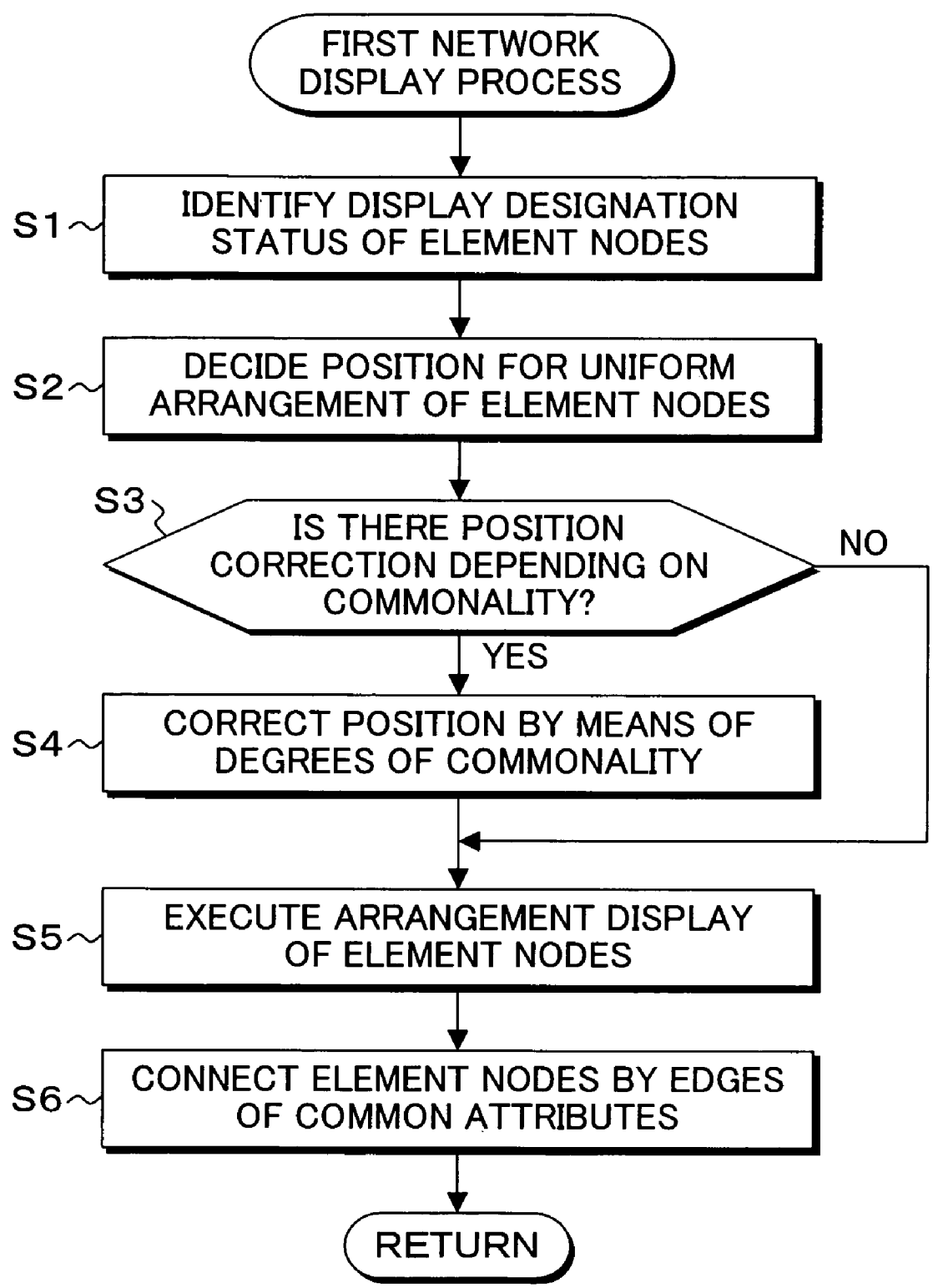
FIG. 11 is a flowchart of the first network display process in FIG. 10.

FIG. 11 is a flowchart showing details of the first network display process in step S5 of FIG. 10. In this first network display process, after the display designation status of the elemental nodes is identified in step S1, uniform arrangement of the element nodes are determined in step S2. Subsequently, if position corrections are directed corresponding to the commonalities such as the number of the common attributes in step S3, the positions are corrected by means of the degrees of the commonalities in step S4. For the arrangement control of the element nodes in step S4, for example the automatic arrangement of nodes in U.S. Pat. No. 3,350,223 may be utilized. Subsequently, after arranging the element nodes which positions are determined in step S5, the edges for the common attributes are connected between the element nodes in step S6.

Figure 12:
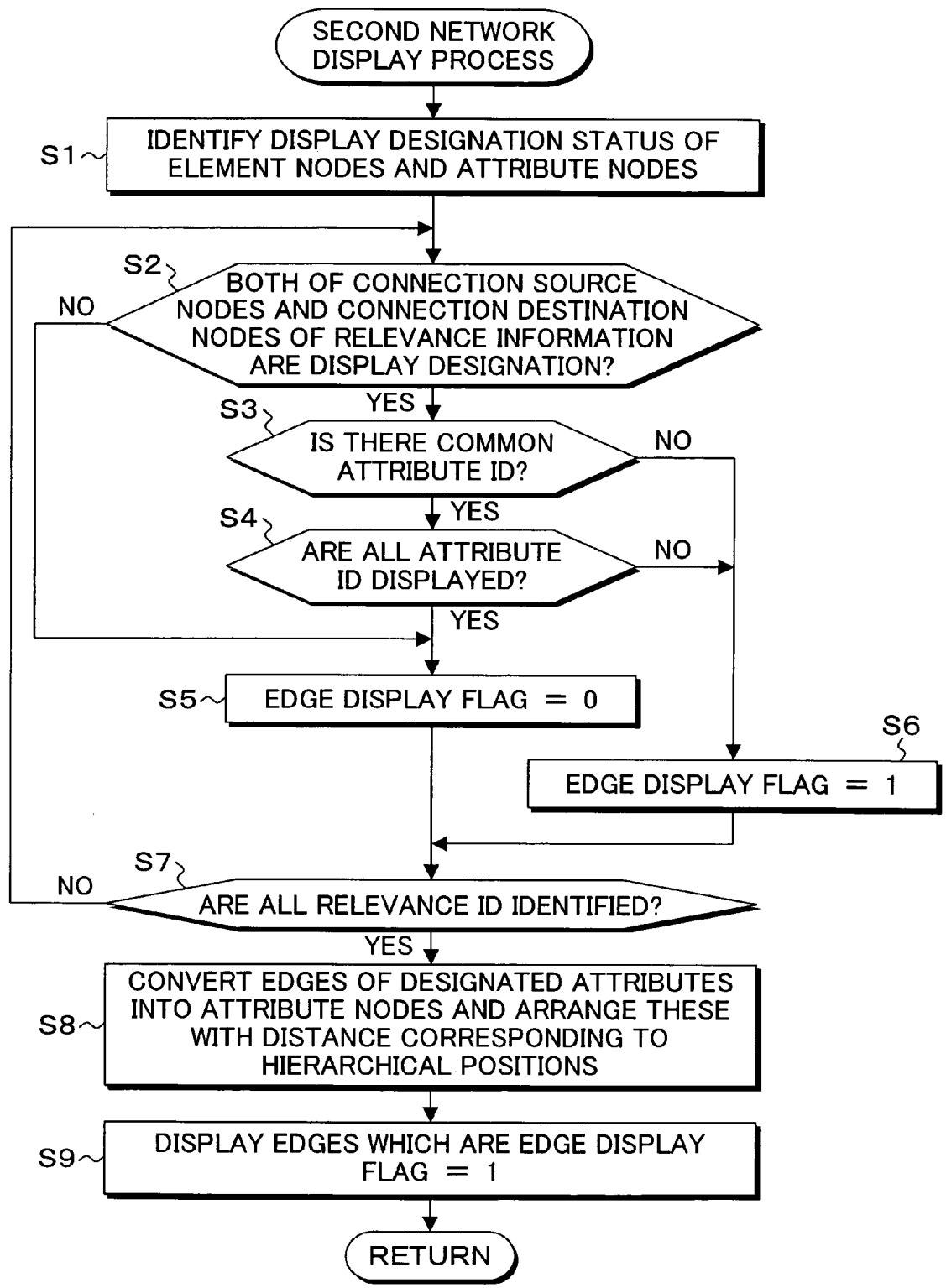
FIG. 12 is a flowchart of the second network display process in FIG. 10.

FIG. 12 is a flowchart showing details of the second network display process in step S7 in FIG. 10. In this second network display process, after identifying display designation status of the element nodes and the attribute nodes in step S1, by referring to the relevance information 20 in FIG. 6, it is checked whether both of the connection source nodes 66 and the connection destination nodes 68 of the relevance information are in display designation or not in step S2. At this point, if the nodes are the element nodes, the element nodes display flags 55 in the element information 16 in FIG. 4 are referred for the display designation, and if the nodes are the attribute nodes, the attribute nodes display flags 64 in the attribute information 18 in FIG. 5 are referred. If both of the connection source nodes 66 and the connection destination nodes 68 of the relevance information are in display designation in step S2, then proceed to step S3 and it is checked whether the common attribute IDs are present or not. If the common attribute IDs are present, since these are relevance between the element nodes, determination for mixing the first network display is needed. On the other hand, if the common attribute IDs are not present, since it will be second network display, then proceed to step S6 and the edge display flags 72 is set to 1. If the common attribute IDs are present in step S3, it is checked whether all the common attribute IDs are displayed as the attribute nodes in step S4. If all the common attribute IDs are displayed as the attribute nodes, since the first network display is not necessary, then proceed to step S5 and the edge display flags are reset to 0. If there is the common attribute ID which is not displayed as the attribute node, since the first network display is mixed, then proceed to step S6 and the edge display flags are set to 1. In step S7, it is checked whether the relevance IDs are identified in these steps S2 to S6 or not for all the relevance IDs 65, which is R001 to R011 in this case, in the relevance information 20 of FIG. 6, and if identified, proceed to step S8. In step S8, the edges for the designated attributes in the first network are converted into the attribute nodes, and the converted attribute nodes are arranged with distances corresponding to the positions in the attribute hierarchical structure. And in step S9, the edges which the edge display flags 72 are set to 1 as shown in the relevance information 20 of FIG. 6 are displayed between the attribute nodes and the element nodes.

Figure 13:
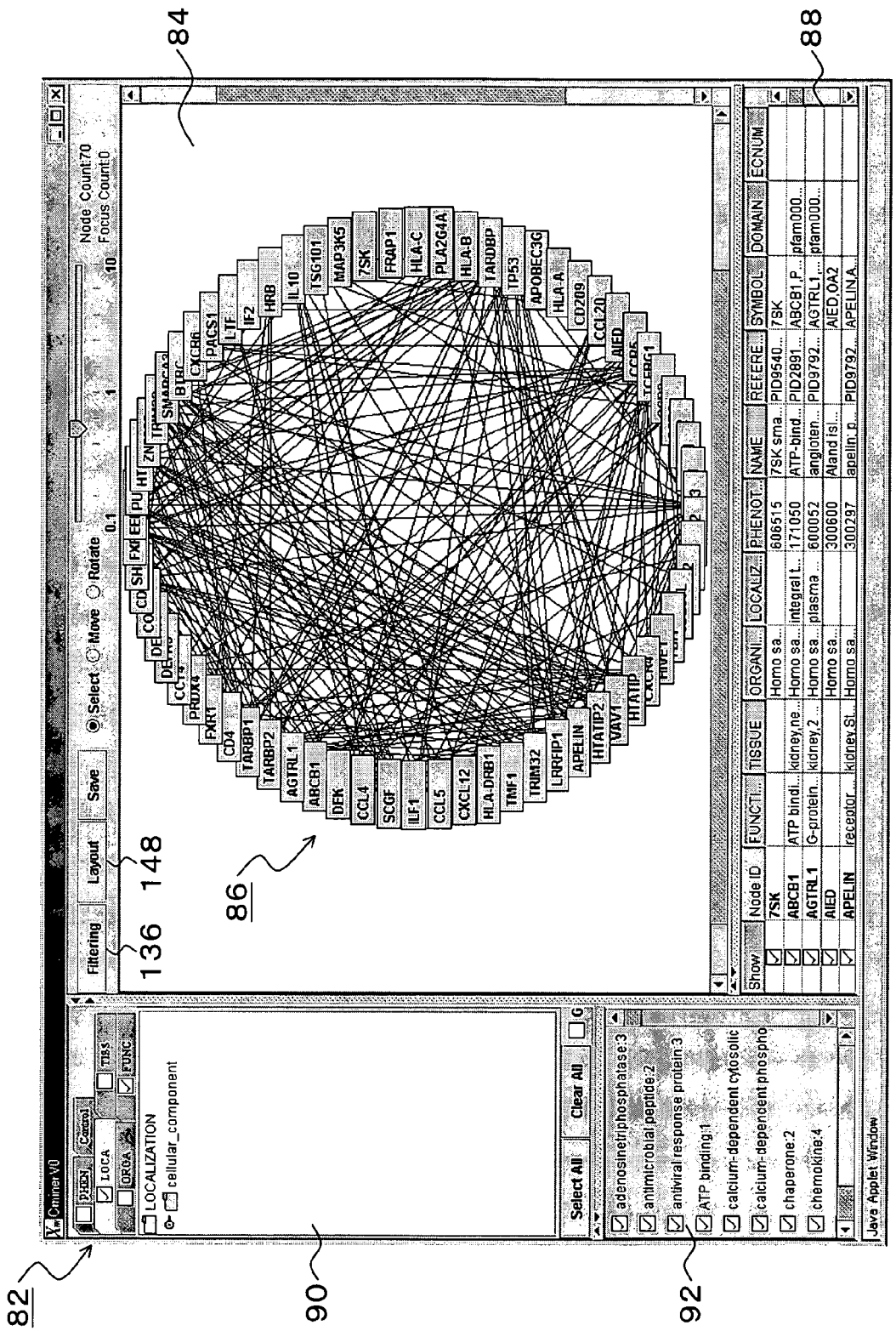
FIG. 13 is a schematic diagram of a display screen of the first network in the case that the invention is applied to the relevance display of gene information.
Figure 14:
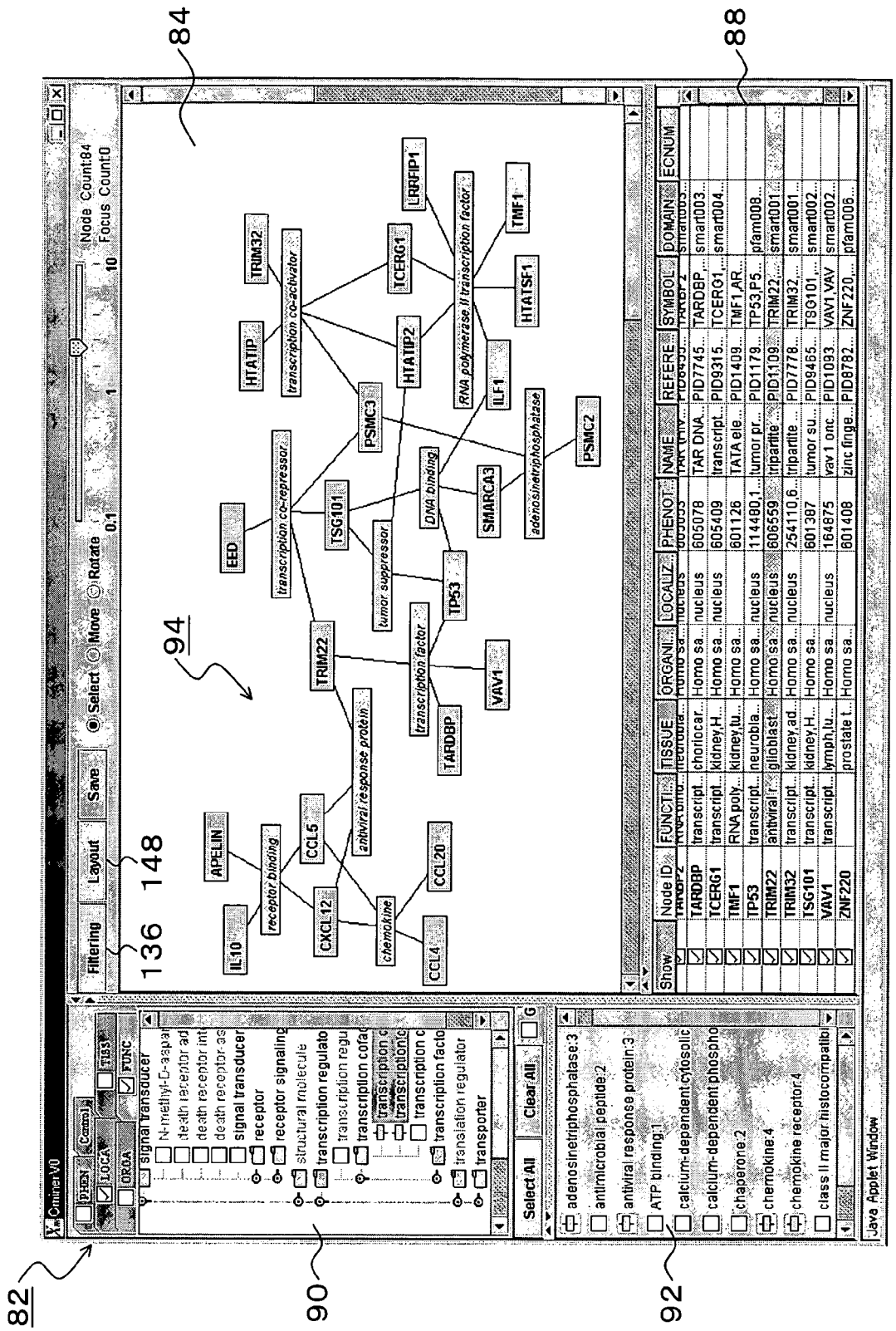
FIG. 14 is a schematic diagram of display screen in which certain attribute edges are converted into attribute nodes in FIG. 3 and the second network is partially displayed.

FIG. 13 is a schematic diagram of a display screen of the first network in the case that the invention is applied to the relevance display of gene information. On the display screen of FIG. 13, a first network 86 is displayed in a network display area 84. Under the network display area 84, gene information is displayed as an element information list 88. Also, on the left of the network display area 84, an attribute information list 90 is displayed, and attributes are provided with check boxes to designate as targets. Regarding to this, the element information list 88 is provided with check boxes on the left of each gene as well. Further, an attribute appearance frequency list 92 is provided. In the upper left of the network display area 84, a filtering button 136 and a layout button 148 are provided. In this display status of the first network 86, if the filtering button 136 is manipulated, it is converted to a display screen of a second network 94 shown in FIG. 14, for example. In this second network 94, for the attribute hierarchical structure in the attribute information list 90, the attribute nodes designated as the attribute node display targets are connected to the element nodes possessing the attributes thereof by the edges.

Although, in above embodiments, the display process of information relevance targeting gene information is taken as an example, the invention is not limited to this and can be directly applied to the analyses targeting the information in which attribute information is added to appropriate element information, for example the analysis of personal purchasing information obtained as POS information in convenience stores, the analysis of patent information and the like.

Further, the invention includes any alteration not impairing the purpose and the benefit thereof and also is not limited by the numeric values shown in the above embodiments.

According to the invention described above, with a first network in which nodes with common attributes are connected by edges in the situation that a plurality of element nodes are arranged, nodes at which the edges are concentrated can be comprehended as the nodes with high commonality at a glance and can be comprehended as notable elements.

Also, by designating certain common attributes under the display status of the first network and displaying a second network in which edges corresponding to common attributes are converted into attribute nodes and arranged, data with strong relevance are located near by each other, and it is facilitated to comprehend data relevance visually and intuitively.

Further, in arrangement of the attribute nodes in the second network in which the edges in the first network are converted into the attribute nodes, by performing arrangement of the attribute nodes based on a hierarchical structure or appearance frequencies of attributes, it is facilitated to narrow down attributes or attribute groups of interest, and the discovery of new knowledge is promoted.

What is claimed is:

1. An information relevance display method, comprising:
designating element information and attribute information;
extracting attributes common to two pieces of element information as relevance information from possessed attributes of plural pieces of element information designated in the search designation step;
displaying a first network by arranging and displaying, for the element information and the attribute information designated in the search designation step, the element information as element nodes, and by connecting with edges two element nodes possessing common attribute information by referring to the relevance information; and
displaying a second network by converting possessed attributes of the element nodes in the first network into a display of attribute nodes for arrangement and by connecting with edges the element nodes and the attribute nodes of the possessed attributes thereof.

2. The information relevance display method according to claim 1, wherein the first network display step includes arranging uniformly the plurality of element nodes.

3. The information relevance display method according to claim 1, wherein the first network display step includes arranging the element nodes depending on the degree of strength of commonality, such as the number of the common attributes.

4. The information relevance display method according to claim 1, wherein the second network display step includes arranging the attribute nodes based on distances corresponding to position information for an attribute hierarchical structure.

5. The information relevance display method according to claim 3, wherein the second network display step includes arranging the attribute nodes by finding distances corresponding to position information for the attribute hierarchical structure to which predefined weight is added.

6. The information relevance display method according to claim 1, wherein the second network display step includes displaying the second network by converting and arranging the common attributes represented by all or some of the designated edges in the first network into a display of the attribute nodes and by connecting with the edges the element nodes and the attribute nodes of attributes possessed by the element nodes.

7. The information relevance display method according to claim 1, wherein the search designation step includes selectively designating the element information and/or the attribute information by displaying a select list for element information and a select list for attribute information represented by a hierarchical structure in the screen displaying the first network or the second network.

8. A program allowing a computer to execute:
designating element information to be searched in an element information file that stores element information including element names to be searched and possessed attributes, as well as attribute information in an attribute information file which stores attribute information including attribute names;
extracting attributes common to two pieces of element information as relevance information from possessed attributes of plural pieces of element information designated in the search designation step;

displaying a first network by arranging and displaying, for the element information and the attribute information designated in the search designation step, the element information as element nodes and by connecting with edges two element nodes possessing common attribute information by referring to the relevance information; and displaying a second network by converting possessed attributes of the element nodes in the first network into a display of attribute nodes for arrangement and by connecting with edges the element nodes and the attribute nodes of the possessed attributes thereof.

9. A computer-readable storage medium encoded with a computer program that when executed causes a computer to perform a method comprising:

designating element information in an element information file that stores element information including element names to be searched and possessed attributes, as well as attribute information in an attribute information file which stores attribute information including attribute names;

designating attributes common to two pieces of element information as relevance information from possessed attributes of plural pieces of element information designated in the search designation step;

displaying a first network by arranging and displaying, for the element information and the attribute information designated in the search designation step, the element information as element nodes and by connecting with edges two element nodes possessing common attribute information by referring to the relevance information; and displaying a second network by converting possessed attributes of the element nodes in the first network into a display of attribute nodes for arrangement and by connecting with edges the element nodes and the attribute nodes of the possessed attributes thereof.

10. A search information relevance display apparatus comprising:

an element information file which stores element information including element names to be searched and possessed attributes;

an attribute information file which stores attribute information including attribute names;

a search designation unit which designates element information in the element information file and attribute information in the attribute information file;

a relevance information extract unit which extracts attributes common to two pieces of element information as relevance information, from possessed attributes of plural pieces of element information designated by the search designation unit; and a display unit which displays a first network by arranging and displaying, for the element information and the attribute information designated by the search designation unit, the element information as element nodes, and by connecting with edges two element nodes possessing common attribute information by referring to the relevance information, and a second network by converting possessed attributes of the element nodes in the first network into a display of attribute nodes for arrangement and by connecting with edges the element nodes and the attribute nodes of the possessed attributes thereof.

* * * * *